United States Patent
Gough et al.

(10) Patent No.: US 9,586,532 B1
(45) Date of Patent: Mar. 7, 2017

(54) VEHICLE SEAT ASSEMBLY WITH ENTERTAINMENT SYSTEM

(71) Applicant: LEAR CORPORATION, Southfield, MI (US)

(72) Inventors: Ben Gough, Southam (GB); Steven Powell, Lytchett Matravers (GB)

(73) Assignee: Lear Corporation, Southfield, MI (US)

( * ) Notice: Subject to any disclaimer, the term of this patent is extended or adjusted under 35 U.S.C. 154(b) by 69 days.

(21) Appl. No.: 14/844,114

(22) Filed: Sep. 3, 2015

(51) Int. Cl.
| | |
|---|---|
| *A47C 7/72* | (2006.01) |
| *B60R 11/02* | (2006.01) |
| *H04N 5/645* | (2006.01) |
| *E05F 3/18* | (2006.01) |
| *E05F 3/20* | (2006.01) |
| *E05D 11/06* | (2006.01) |
| *B60R 11/00* | (2006.01) |
| *B60N 2/48* | (2006.01) |
| *B60N 2/00* | (2006.01) |

(52) U.S. Cl.
CPC .......... *B60R 11/0235* (2013.01); *B60R 11/02* (2013.01); *E05D 11/06* (2013.01); *E05F 3/18* (2013.01); *E05F 3/20* (2013.01); *H04N 5/645* (2013.01); *A47C 7/72* (2013.01); *B60N 2/002* (2013.01); *B60N 2/4876* (2013.01); *B60R 2011/008* (2013.01); *B60R 2011/0015* (2013.01); *B60R 2011/0017* (2013.01); *B60R 2011/0094* (2013.01)

(58) Field of Classification Search
CPC ........ B60R 11/0235; B60R 2011/0017; B60N 2/4876; B60N 2/002

USPC .................... 297/217.1–217.7; 348/827, 837
See application file for complete search history.

(56) References Cited

U.S. PATENT DOCUMENTS

| | | | |
|---|---|---|---|
| 6,698,832 B2 | 3/2004 | Boudinot | |
| 6,871,356 B2 * | 3/2005 | Chang ................. | B60R 11/0235 348/837 |
| 7,084,932 B1 | 8/2006 | Mathias et al. | |
| 7,149,078 B2 * | 12/2006 | Schedivy ............. | B60N 2/4876 297/217.4 |
| 7,413,248 B2 | 8/2008 | Matsuhashi | |
| 7,866,746 B2 | 1/2011 | Watanabe et al. | |
| 7,909,397 B2 * | 3/2011 | Shalam ............... | B60R 11/0235 297/217.1 |
| 8,141,948 B2 | 3/2012 | Cassellia et al. | |
| 8,154,670 B2 | 4/2012 | Maniatopoulos et al. | |
| 8,388,061 B2 | 3/2013 | Saito et al. | |

(Continued)

FOREIGN PATENT DOCUMENTS

| | | |
|---|---|---|
| DE | 202014100457 U1 | 3/2014 |
| DE | 202014100466 U1 | 3/2014 |

*Primary Examiner* — Syed A Islam
(74) *Attorney, Agent, or Firm* — Brooks Kushman P.C.

(57) ABSTRACT

A vehicle seat assembly has an entertainment system, and includes a seat back having a cavity disposed therein. A display screen arrangement is rotatably attached to the seat back and is movable between a first position wherein the display screen arrangement is disposed within the cavity in the seat back and a second position wherein the display screen arrangement is disposed outside of the cavity in the seat back. A speaker arrangement is in electrical communication with the display screen arrangement and disposed behind the cavity in the seat back such that the speaker arrangement is covered by the display screen arrangement when the display screen arrangement is in the first position.

20 Claims, 5 Drawing Sheets

(56) References Cited

U.S. PATENT DOCUMENTS

| | | |
|---|---|---|
| 8,585,140 B2 | 11/2013 | Chang |
| 8,625,034 B2 | 1/2014 | Campbell et al. |
| 8,794,700 B2 | 8/2014 | Brawner |
| 9,016,627 B2 | 4/2015 | Margis et al. |
| 2004/0239155 A1* | 12/2004 | Fourrey ................. B60N 2/206 297/163 |
| 2006/0109388 A1 | 5/2006 | Sanders et al. |
| 2006/0119151 A1* | 6/2006 | Vitito ..................... B60K 35/00 297/217.3 |
| 2008/0246320 A1* | 10/2008 | Chang ................. B60R 11/0235 297/217.3 |
| 2015/0002991 A1 | 1/2015 | Vander Sluis |

\* cited by examiner

VEHICLE SEAT ASSEMBLY WITH ENTERTAINMENT SYSTEM

TECHNICAL FIELD

The present invention relates to a vehicle seat assembly with an entertainment system.

BACKGROUND

With the increasing popularity of entertainment systems in vehicles, including display terminals with Internet access and associated audio equipment, vehicle manufacturers face a variety of design challenges, including packaging constraints and maintaining aesthetic quality of a vehicle interior while providing the desired audio and visual components. The following patents describe various types of audio and visual systems for vehicles: U.S. Pat. No. 7,413,248, U.S. Pat. No. 8,141,948, U.S. Pat. No. 8,585,140, U.S. Pat. No. 8,625,034, U.S. Pat. No. 8,794,700 and U.S. Pat. No. 9,016,627.

SUMMARY

At least some embodiments of the present invention may include a vehicle seat assembly having an entertainment system. The vehicle seat assembly may include a seat back having a cavity therein, and a display screen arrangement attached to the seat back and including a display screen and a support structure supporting the display screen. Each of a pair of hinges has a first portion attached to the seat back and a second portion attached to a back side of the display screen such that the display screen arrangement is rotatable between a stowed position wherein the display screen faces forward and is disposed within the cavity in the seat back and a use position wherein the display screen faces rearward and is disposed outside the cavity in the seat back. A speaker arrangement is in electrical communication with the display screen and disposed in the seat back. The speaker arrangement is positioned to be covered by the display screen arrangement such that a front of the display screen faces a front of the speaker arrangement when the display screen arrangement is in the stowed position.

At least some embodiments of the present invention may include a vehicle seat assembly having an entertainment system. The vehicle seat assembly may include a seat back and a display screen arrangement rotatably attached to the seat back and movable between a stowed position wherein the display screen arrangement faces forward and a use position wherein the display screen arrangement faces rearward. A speaker associated with the display screen arrangement is disposed in the seat back and positioned to be covered by the display screen arrangement when the display screen arrangement is in the stowed position.

At least some embodiments of the present invention may include a vehicle seat assembly having an entertainment system. The vehicle seat assembly may include a seat back having a cavity therein, and a display screen arrangement rotatably attached to the seat back and movable between a first position wherein the display screen arrangement is disposed within the cavity in the seat back and a second position wherein the display screen arrangement is disposed outside of the cavity in the seat back. A speaker arrangement in electrical communication with the display screen arrangement is disposed behind the cavity in the seat back such that the speaker arrangement is covered by the display screen arrangement when the display screen arrangement is in the first position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
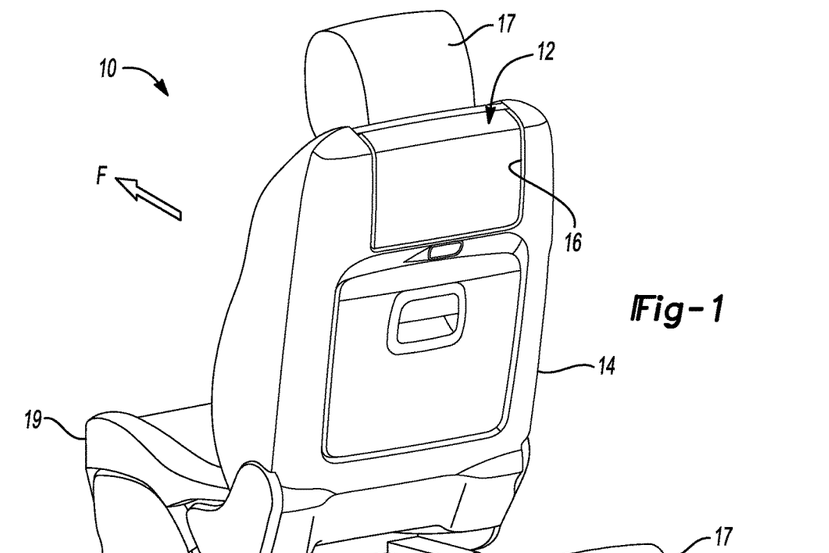
FIG. 1 shows a perspective view of a vehicle seat assembly having an entertainment system in accordance with an embodiment of the present invention, including a display screen arrangement in a stowed position.
Figure 2:
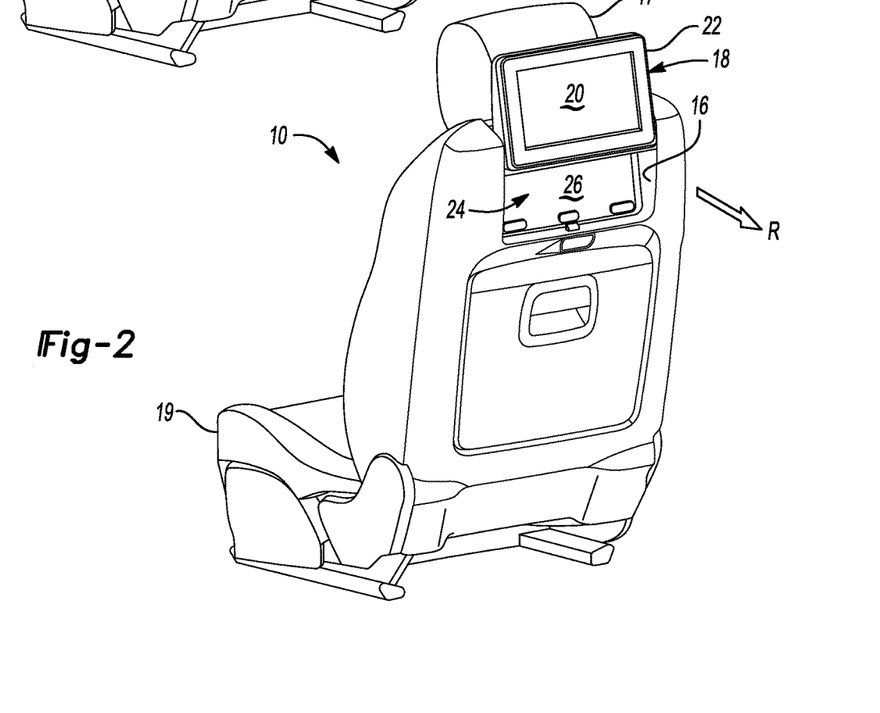
FIG. 2 shows the vehicle seat assembly of FIG. 1 having the display screen arrangement in a use position.

FIGS. 1 and 2 show a seat assembly 10 in accordance with embodiments of the present invention. The seat assembly 10 includes an entertainment system shown generally at 12, and has a seat back 14 having a cavity 16 disposed therein. The seat assembly 10 also includes a head restraint 17 and a seat cushion 19. The entertainment system 12 includes a display screen arrangement 18, which is attached to the seat back 14. The display screen arrangement 18 is movable between a first, stowed position as shown in FIG. 1 where the display screen arrangement 18 is disposed within the cavity 16, and a second, use position as shown in FIG. 2 where the display screen arrangement 18 is disposed outside the cavity 16. It is worth noting that as used herein, the description of the display screen arrangement 18 being disposed "within the cavity 16" or "outside the cavity 16" does not require that each and every part of the display screen arrangement 18 be completely within or without the cavity 16—although in some embodiments it may be. Rather, as illustrated in the drawing figures, most of the display screen arrangement 18 in this embodiment is within the cavity 16 when it is in the stowed position, and likewise, most of the display screen arrangement 18 in this embodiment is outside of the cavity 16 when it is in the use position. Other embodiments of the present invention may have configurations which differ somewhat from the illustrated embodiment, and in such embodiments, more or less of the display screen arrangement may be contained within or outside of its associated cavity in the seat back.

The display screen arrangement 18 includes a display screen 20 and a support structure 22 which supports the display screen 20. In the embodiment shown in FIG. 2, the support structure 22 includes a frame surrounding the display screen 20, and may also include a housing or other structure to support the display screen 20. When it is in the stowed position, the display screen 20 generally faces toward a front—see direction arrow (F)—of the seat assembly 10 when the seat back 14 is in its use position as shown in FIG. 1. Conversely, when it is in the use position, the display screen 20 generally faces toward a rear—see direction arrow (R)—of the seat assembly 10 when the seat back 14 is in its use position as shown in FIG. 2.

The entertainment system 18 also includes a speaker arrangement 24 which is in electrical communication with the display screen 20, and which is also disposed in the seat back 14. As shown in FIG. 2, the speaker arrangement 24 includes a grille 26 covering a number of speaker components, such as midrange speakers 28, 30 and tweeter 32 shown in FIG. 3. The speaker arrangement 24 is positioned to be covered by the display screen arrangement 18 when the display screen arrangement 18 is in the stowed position, such as shown in FIG. 1. Among other benefits, this helps to provide an aesthetically pleasing appearance for the seat assembly 10 when the display screen arrangement 18 is in the stowed position and the speaker arrangement 24 is not in use. More specifically, the speaker arrangement 24 is positioned to be covered by the display screen arrangement 18 such that a front of the display screen 20—i.e., the portion intended to be viewed by a user-faces a front of the speaker arrangement 24—see, e.g., the grille 26 in FIG. 2—when the display screen arrangement is in the stowed position as shown in FIG. 1.

Figure 3:
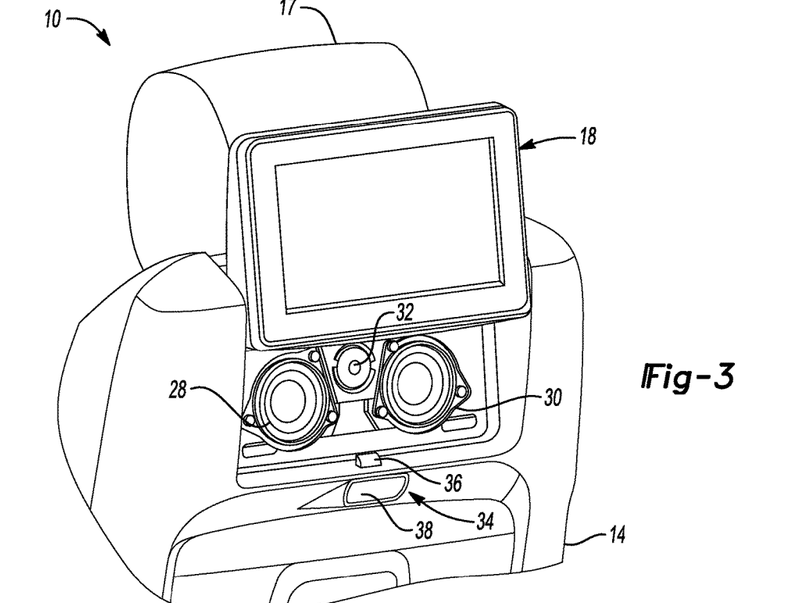
FIG. 3 shows the vehicle seat assembly of FIG. 1 with audio speakers exposed to show their position.
Figure 4:
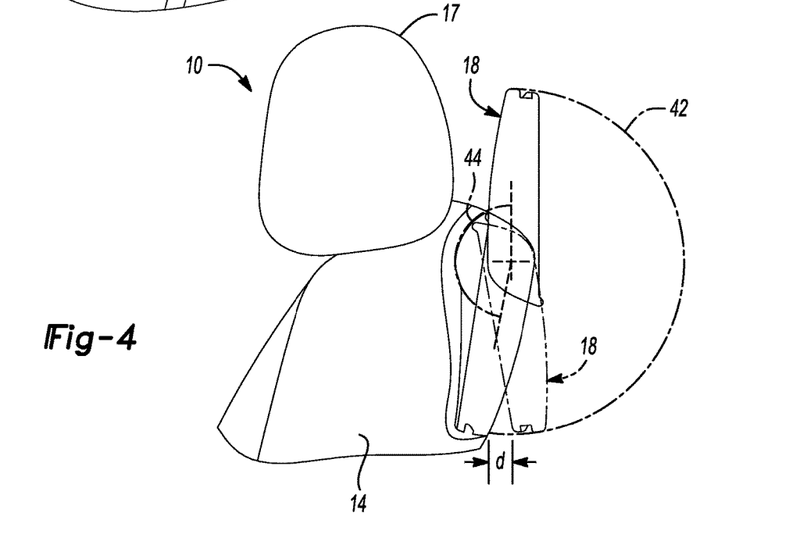
FIG. 4 shows a side view of the vehicle seat assembly of FIG. 1 illustrating a range of movement for the display screen arrangement.

As shown in FIG. 3, the vehicle seat assembly 10 also includes a latch arrangement 34, which includes a latch 36 and an actuator 38. The latch 36 is configured to help maintain the display screen arrangement 18 in the stowed position, and which can be released by the actuator 38. In the embodiment shown in FIG. 3, the actuator is a button that can be depressed by an occupant seated in the seat directly behind the seat assembly 10 to release the display screen arrangement 18 from the stowed position. As explained in more detail below in conjunction with FIGS. 5 and 6, upon release of the latch 36, the display screen arrangement 18 will "pop out" a predetermined distance (d) such as shown in FIG. 4. This allows the user access to rotate the display screen arrangement 18 into an upright or use position.

Also shown in FIG. 4 is an arc 42 representing the rotational range of motion of the display screen arrangement 18—i.e., the rotation envelope. In the illustrated embodiment, it may be on the order of 190°, although in other embodiments it may be more or less than 190°, depending on the particular seat assembly configuration. The arc 44 illustrated in FIG. 4 represents the front clearance envelope. As shown in FIG. 4, the display screen arrangement 18 is generally vertical when it is in the use position; however, as explained in more detail below, it may be conveniently tilted backward to a position where it is not completely vertical if desired by the user.

Figure 5:
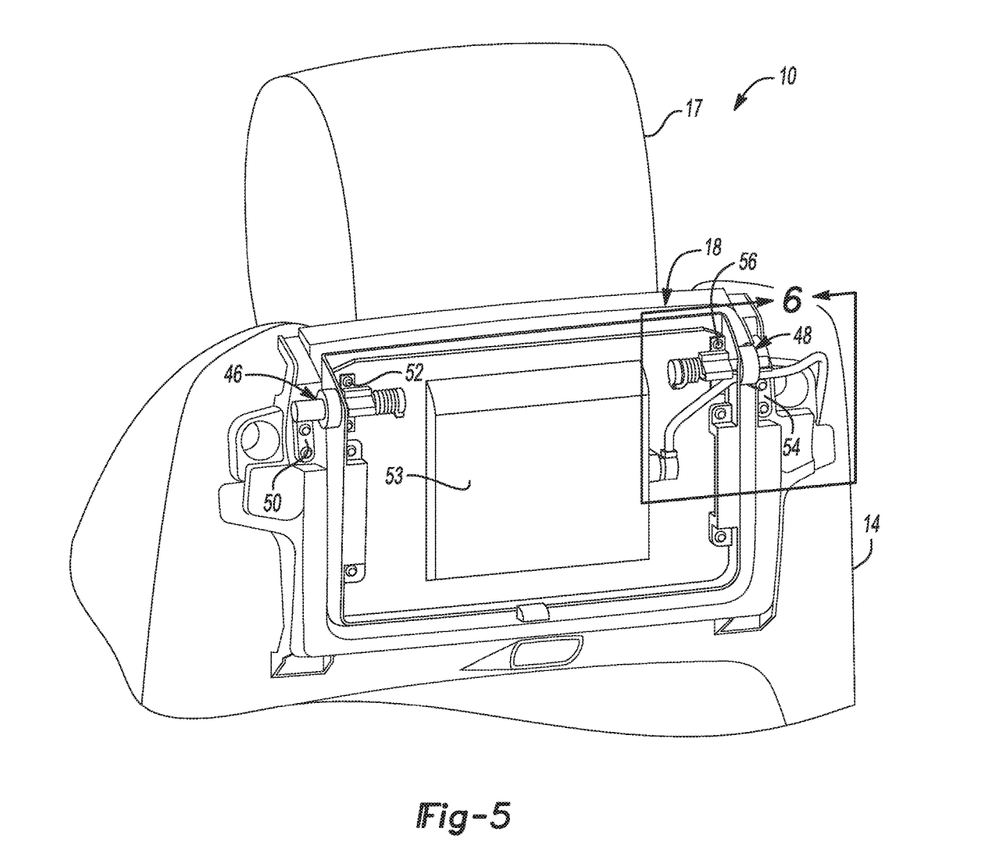
FIG. 5 shows the vehicle seat assembly of FIG. 1 having a portion of the display screen arrangement removed, illustrating hinge mechanisms associated with the display screen arrangement.

FIG. 5 shows a portion of the seat assembly 10, and in particular, illustrates the display screen arrangement 18 with a portion of it removed revealing a pair of hinges 46, 48. The hinge 46 has a first portion 50 attached to the seat back 14 and a second portion 52 attached to a back side 53 of the display screen 20. Similarly, the hinge 48 has a first portion 54 attached to the seat back 14 and a second portion 56 attached to the back side 53 of the display screen 20. As shown in FIG. 5, the hinges 46, 48 are disposed on opposite sides of the display screen arrangement 18 and facilitate rotational movement of the display screen arrangement 18 between the stowed and use positions.

Figure 6:
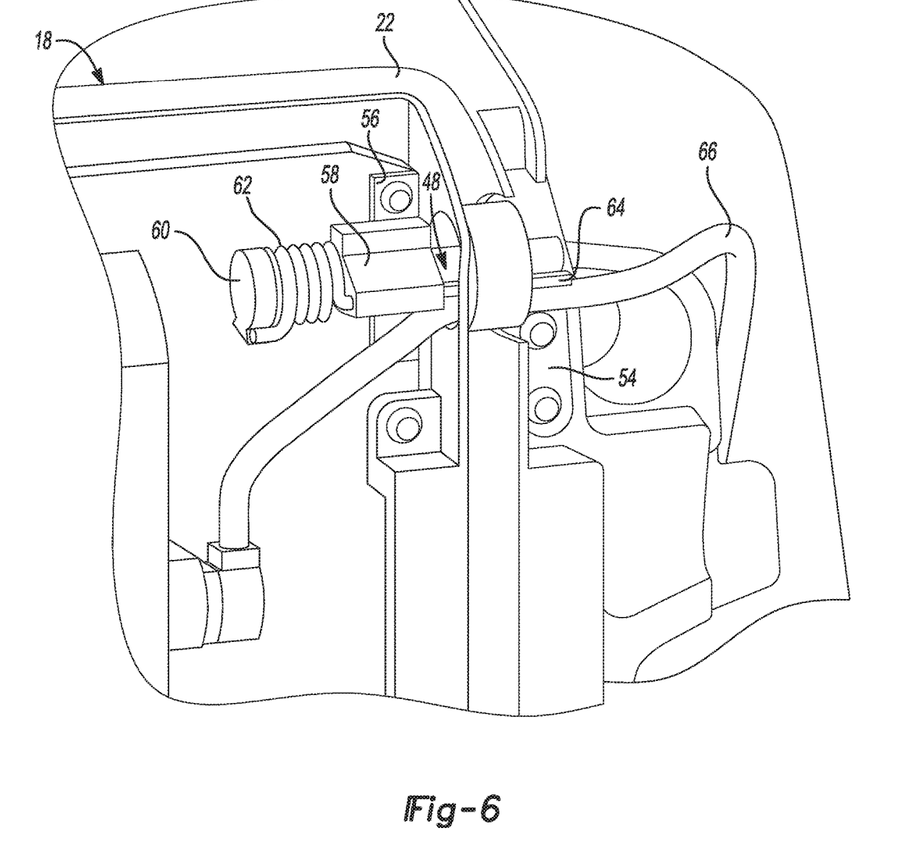
FIG. 6 shows a detail view of one of the hinge mechanisms of FIG. 5.

The hinge 48, including the first and second portions 54, 56, is shown in FIG. 6, which is a close-up view of the detail called-out in FIG. 5. Also shown in FIG. 6 are friction elements 58, which apply a force to the first portion 54 of the hinge 48 such that the display screen arrangement 18 will maintain a rotational position as it is moved between the stowed and use positions. Thus, as noted above in conjunction with FIG. 4, the display screen arrangement may be placed in a position somewhat less than vertical for convenience of viewing, and the friction elements 58 will maintain the display screen arrangement 18 in the desired position. In the embodiment illustrated in the drawing figures, a similar set of friction elements is also associated with the hinge 46, although in other embodiments this may not be the case.

Returning to FIG. 6, there is illustrated a spring 62, which is attached to and rotatable with the display screen arrangement 18. A cam 60 is configured to cooperate with the spring 62, which in the embodiment illustrated in FIG. 6 is a torsion spring disposed on the first portion 54 of the hinge 48. As shown in FIG. 5, a similar cam and spring arrangement is associated with the hinge 46, although in other embodiments the spring and cam arrangement may be associated with only one of the hinges. The cam 60 and spring 62 are configured such that as the display screen arrangement 18 is moved from the use position to the stowed position, the cam 60 contacts the spring at a predetermined rotational position of the display screen arrangement 18 and imparts to the display screen arrangement 18 a force opposing movement of the display screen arrangement 18 toward the stowed position.

For example, in FIG. 4, a distance (d) is associated with the view of the display screen arrangement 18 shown in phantom. Although the distance (d) is exaggerated in FIG. 4 for clarity, in this embodiment this distance may be between 15 and 30 millimeters (mm), although it may be outside this range in other embodiments. In practice, as the display screen arrangement 18 is moved between the use position—shown in solid lines in FIG. 4—toward the stowed position, as shown in phantom, it will encounter only the frictional force resistance imposed by the friction elements of the hinges for most of its range of travel. When it gets within the distance (d) of being completely stowed, the display screen arrangement 18 will also encounter the resistance of the spring 62. The force imparted by the spring 62 may be relatively easily overcome and the display screen arrangement fully stowed with the latch 36 keeping it in place—see, e.g., FIG. 1.

While the display screen arrangement 18 is in the fully stowed position and latched, the spring 62 continues to impart a force to the display screen arrangement 18, effectively acting to try to move the display screen arrangement from the stowed position outward toward the use position. The force acting on the display screen arrangement 18 when it is in the stowed position provides a number of advantages. For example, by having the display screen arrangement 18 urged tightly against the latch 36, any potential buzz, squeak or rattle is significantly reduced or eliminated completely. In addition, the force of the spring 62 will cause the display screen arrangement 18 to "pop out" when the button 38 is actuated to release the latch 36. As described above, this forces the display screen arrangement 18 outward from the cavity 16 a certain distance, such as the distance (d), which allows a user to reach behind the display screen 18 and rotate it upward toward the use position.

Also shown in FIG. 6, is a harness guide, configured as an elongate member 64 attached to and extending outward from a side of the support structure 22. The harness guide helps to guide electrical wires, such as a wire harness 66, from outside the display screen arrangement 18 to a position inside the display screen arrangement for connection to the display screen 20. The wire harness 66 may be configured to carry electrical power, communications, or both to the display screen 20, and may further connect the display screen 20 to other components, such as the speaker arrangement 24, or to a centralized control system. The harness guide 64 helps to ensure that the wiring will not become tangled as the display screen arrangement 18 is repeatedly moved between the stowed and use positions.

Figure 7:
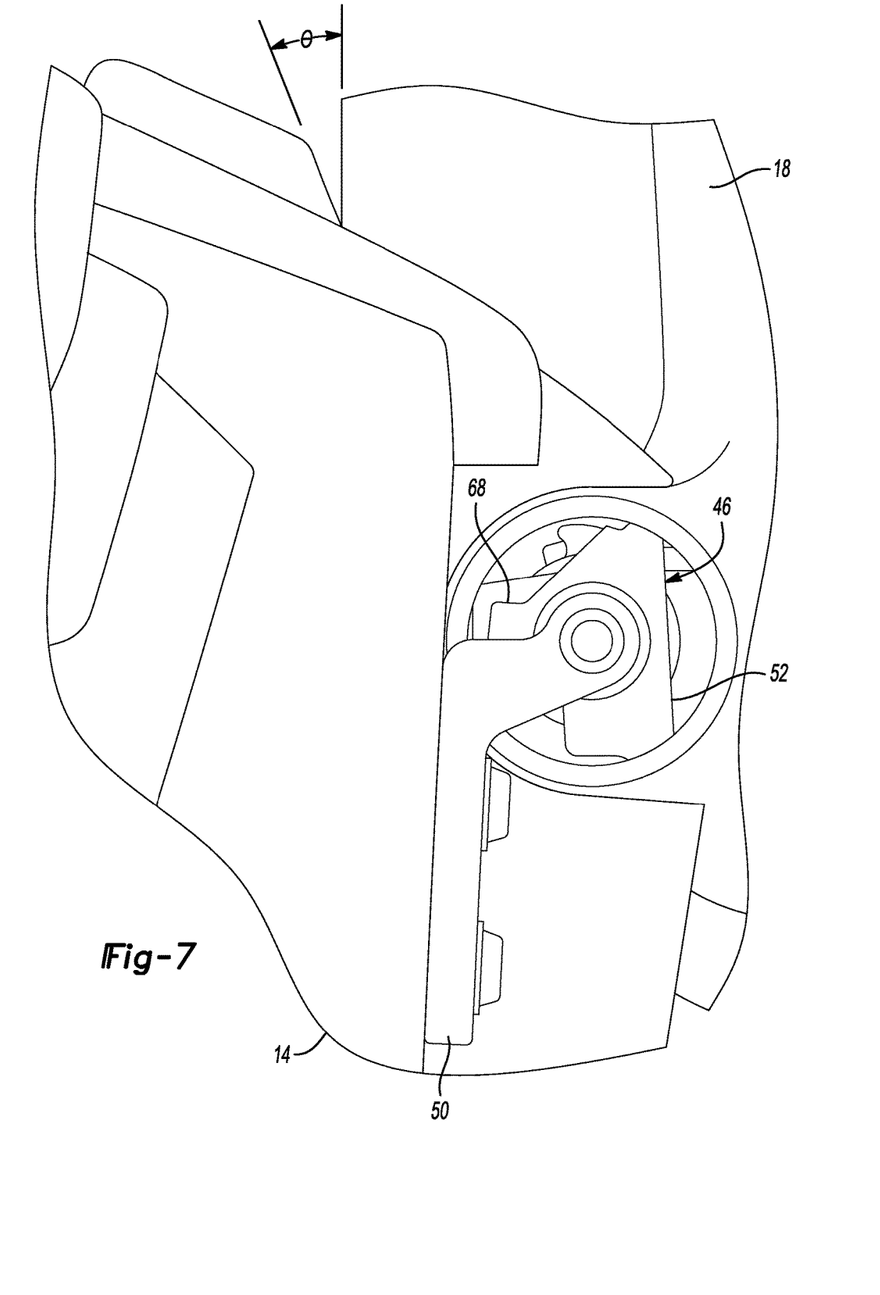
FIG. 7 shows a portion of one of the hinge mechanisms, including an end-stop feature for limiting the range of motion of the display screen arrangement.

FIG. 7 shows another feature of one of the hinges, in this case the hinge 46. Specifically, the hinge 46 includes an end-stop 68 on the second portion 52 of the hinge 46. The end-stop 68 is configured to contact of the first portion 50 of the hinge 46 as the display screen arrangement 18 reaches the vertical position. Owing to flexibility of the various components, the display screen arrangement may continue to rotate a small amount past vertical—for example by the angle (θ). In the embodiment shown in FIG. 7, the angle θ may be approximately 3°; however, in other embodiments it may be more or less depending on the particular design requirements. The end-stop 68 is configured such that even if the display screen arrangement rotates a small amount past vertical, it will not continue to rotate forward so far as to cause damage to any of the components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly having an entertainment system, comprising:
    a seat back having a cavity therein;
    a display screen arrangement attached to the seat back and including a display screen and a support structure supporting the display screen;
    a pair of hinges each having a first portion attached to the seat back and a second portion attached to a back side of the display screen such that the display screen arrangement is rotatable between a stowed position wherein the display screen faces forward and is disposed within the cavity in the seat back and a use position wherein the display screen faces rearward and is disposed outside the cavity in the seat back; and
    a speaker arrangement in electrical communication with the display screen and disposed in the seat back, the speaker arrangement being positioned to be covered by the display screen arrangement such that a front of the display screen faces a front of the speaker arrangement when the display screen arrangement is in the stowed position.

2. The vehicle seat assembly of claim 1, wherein the hinges apply a frictional force to the display screen arrangement to maintain a rotational position of the display screen arrangement as it is moved between the stowed and use positions.

3. The vehicle seat assembly of claim 2, further comprising:
    a cam attached to one of the hinges; and
    a torsion spring disposed on the first portion of one of the hinges and attached to the second portion of the one of the hinges such that when the display screen arrangement is moved from the use position toward the stowed position, the cam contacts the torsion spring at a predetermined rotational position of the display screen arrangement and imparts to the display screen arrangement a force opposing movement of the display screen arrangement toward the stowed position.

4. The vehicle seat assembly of claim 3, further comprising a latch arrangement including a latch and an actuator, the latch arrangement being disposed in the seat back and operable to secure the display screen arrangement in the stowed position.

5. The vehicle seat assembly of claim 4, wherein the force imparted by the torsion spring to the display screen arrangement urges the display screen arrangement toward the use position and against the latch when the display screen arrangement is in the stowed position.

6. The vehicle seat assembly of claim 4, wherein the torsion spring effects movement of the display screen arrangement between about 15 millimeters and 30 millimeters toward the use position when the actuator is operated to open the latch when the display screen arrangement in the stowed position.

7. The vehicle seat assembly of claim 1, further comprising:
    a head restraint attached to the seat back; and
    an end-stop disposed on at least one of the hinges and positioned to stop the display screen arrangement from contacting the head restraint as the display screen arrangement is moved into the use position.

8. The vehicle seat assembly of claim 1, further comprising an elongate member attached to and extending outward from a side of the support structure for guiding electrical wires from outside the display screen arrangement to a position inside the display screen arrangement for connection to the display screen.

9. A vehicle seat assembly having an entertainment system, comprising:
    a seat back;
    a display screen arrangement rotatably attached to the seat back and movable between a stowed position wherein the display screen arrangement faces forward and a use position wherein the display screen arrangement faces rearward; and
    a speaker associated with the display screen arrangement and disposed in the seat back and positioned to be covered by the display screen arrangement when the display screen arrangement is in the stowed position.

10. The vehicle seat assembly of claim 9, further comprising a pair of hinges attached to the seat back and attached to and disposed on opposite sides of the display screen arrangement for facilitating rotational movement of the display screen arrangement between the stowed and use positions.

11. The vehicle seat assembly of claim 10, further comprising:
    a head restraint attached to the seat back, and an end-stop disposed on at least one of the hinges and positioned to inhibit the display screen arrangement from contacting the head restraint as the display screen arrangement is moved into the use position.

12. The vehicle seat assembly of claim 10, wherein the hinges apply a frictional force to a portion of the display screen arrangement to maintain a rotational position of the display screen arrangement as it is moved between the stowed and use positions.

13. The vehicle seat assembly of claim 10, further comprising:
   a cam attached to one of the hinges; and
   a torsion spring disposed proximate the cam such that when the display screen arrangement is moved from the use position toward the stowed position, the cam contacts the torsion spring at a predetermined rotational position of the display screen arrangement and imparts to the display screen arrangement a force opposing movement of the display screen arrangement toward the stowed position.

14. The vehicle seat assembly of claim 13, further comprising a latch disposed in the seat back and operable to secure the display screen arrangement in the stowed position.

15. The vehicle seat assembly of claim 14, wherein the force imparted by the torsion spring to the display screen arrangement urges the display screen arrangement toward the use position and against the latch when the display screen arrangement is in the stowed position.

16. The vehicle seat assembly of claim 15, wherein the torsion spring effects movement of the display screen arrangement toward the use position by a predetermined distance when the latch is opened with the display screen arrangement in the stowed position.

17. The vehicle seat assembly of claim 9, wherein the display screen arrangement includes a display screen and a support structure supporting the display screen, the vehicle seat assembly further comprising a harness guide attached to and extending outward from a side of the support structure for guiding a wire harness from outside the display screen arrangement to a position inside the display screen arrangement for connection to the display screen.

18. A vehicle seat assembly having an entertainment system, comprising:
   a seat back having a cavity disposed therein;
   a display screen arrangement rotatably attached to the seat back and movable between a first position wherein the display screen arrangement is disposed within the cavity in the seat back and a second position wherein the display screen arrangement is disposed outside of the cavity in the seat back; and
   a speaker arrangement in electrical communication with the display screen arrangement and disposed behind the cavity in the seat back such that the speaker arrangement is covered by the display screen arrangement when the display screen arrangement is in the first position.

19. The vehicle seat assembly of claim 18, further comprising a pair of hinges attached to the seat back and attached to and disposed on opposite sides of the display screen arrangement for facilitating rotational movement of the display screen arrangement between the first and second positions, at least one of the hinges including friction elements configured to apply a force to a portion of the display screen arrangement to maintain a rotational position of the display screen arrangement as it is moved between the first and second positions.

20. The vehicle seat assembly of claim 19, further comprising:
   a cam attached to one of the hinges; and
   a torsion spring disposed on a first portion of one of the hinges and attached to a second portion of the one of the hinges such that when the display screen arrangement is moved from the second position toward the first position, the cam contacts the torsion spring and imparts to the display screen arrangement a force opposing movement of the display screen arrangement toward the first position.

* * * * *